Oct. 19, 1965 SHINTARO OSHIMA ET AL 3,213,430

THIN FILM MEMORY APPARATUS

Filed Oct. 20, 1960 3 Sheets-Sheet 1

THIN FILM MEMORY APPARATUS

Filed Oct. 20, 1960 3 Sheets-Sheet 3

United States Patent Office 3,213,430
Patented Oct. 19, 1965

3,213,430

THIN FILM MEMORY APPARATUS

Shintaro Oshima, Musashino-shi, Hajime Enomoto, Ichikawa-shi, Kakuo Futami and Toshihiko Kobayashi, Mitaka-shi, Tetsusaburo Kamibayashi, Shinza-machi, Kitaadachi-gun, Saitama-ken, Japan, assignors to Kokusai Denshin Denwa Kabushiki Kaisha, Tokyo-to, Japan Filed Oct. 20, 1960, Ser. No. 63,790
Claims priority, application Japan, Oct. 26, 1959, 34/33,496; Aug. 29, 1960, 35/36,075
12 Claims. (Cl. 340—174)

This invention relates to a new and improved memory apparatus wherein, in place of conventional magnetic cores such as ferrite cores, thin magnetic films deposited on substrata are assembled in laminar arrangement to form close magnetic circuits or to have an effect equivalent to that of magnetic cores.

It is an object of the present invention to provide a new and improved memory apparatus of the type as described above.

It is another object of the invention to provide a memory apparatus as stated above by means of which writing-in and reading-out can be accomplished with low power and, moreover, at a high speed.

It is yet another object of the invention to provide a memory apparatus as stated above which is of a miniature size and of a simple and easily manufactured construction.

The details of the invention and its principle as well as the manner in which the objects and advantages of the invention may best be achieved will be understood more fully from a consideration of the following description, taken in conjunction with the accompanying drawings in which the same or equivalent parts are designated by the same reference numerals or letters, and in which.

Figure 1:
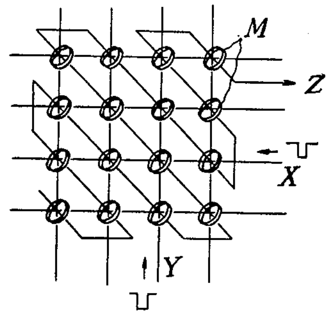
FIGURE 1 is a simplified, schematic diagram of a conventional, matrix memory apparatus.

Heretofore, the conventional matrix memory apparatus have consisted of small-size, doughnut shaped, magnetic cores M having a rectangular hysteresis characteristic, or loop for example, ferrite cores, arranged, for example, as in FIG. 1, wherein, through suitable row conductors X and column conductors Y, pulse currents which are somewhat smaller than the coercive force $H_c$ are made to flow; and the memorized contents are read out by detecting the variations in the states of the magnetic cores at the intersections. The detection is made possible by the existence or non-existence of an output from the output winding Z. However, the use of a ferrite core as a small-size magnetic core entails the inconvenience of having to pass each one of the selection conductors and reading-out conductors, such as X, Y, and Z, through the core, wherefor the fabrication of the component parts into a matrix consumes considerable effort. Apparatus wherein thin films of a magnetic metal, such as permalloy, of rapid switching characteristic for hastening the access time of the memory apparatus also have disadavntages such as the necessity of a special machine and technique for the production of the roll film and the difficulty of making the film thinner than a certain limit. In the present state of the art, memory apparatus wherein permalloy is employed are being developed, but in almost all cases, these apparatus are accompanied by such disadvantages as low output voltage, difficulty in arrangement of conductors for forming the matrices, and difficulty in obtaining uniform characteristics.

The above-mentioned disadvantages of the conventional memory apparatus have been eliminated by the memory apparatus of the present invention, wherein two substrata on which (*a*) patterns of a plurality of thin magnetic film bodies have been deposited so as to become, mutually, mirror images are disposed in mutually parallel positions with row conductors and column conductors disposed therebetween in such a manner that each conductor is encompassed by upper and lower magnetic films, which form a closed magnetic circuit or have an effect equivalent to that of a closed circuit.

By the above-described construction, since the magnetic films form closed magnetic circuits, the output voltage can be made high; consequently, the problem of variation of $S/N$ due to induction between the conductors can be reduced. The provision of closed magnetic circuits also reduces irregularities in the characteristics of the apparatus.

Figures 2A, 2B:
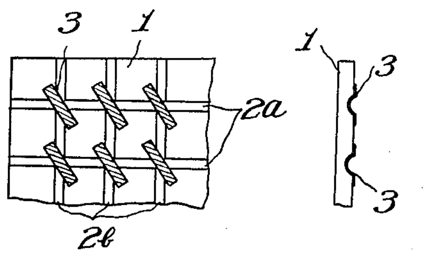
FIGURES 2A and 2B are, respectively, a plan view and a side view of one representative embodiment of the present invention.

In the embodiment of FIGS. 2A and 2B, the essential parts are: a plane, polished, substratum 1, having on its major surface mutually perpendicular series of grooves 2*a* and 2*b*, which are for containing, respectively, row conductors and column conductors, and thin-film magnetic bodies 3, which have been deposited across the grooves 2*a* and 2*b* with the necessary clearance by some method such as sputtering or electrolytic depositing.

Figures 3A, 3B:
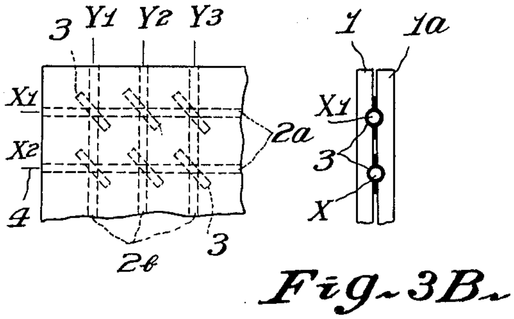
FIGURES 3A and 3B are, respectively, a plan view and a side view of another embodiment of the present invention.
Figure 4:
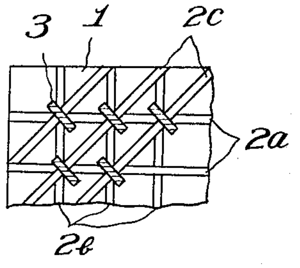
FIGURES 4, 5 and 6 are plan views of the other embodiments of the present invention.
Figure 5:
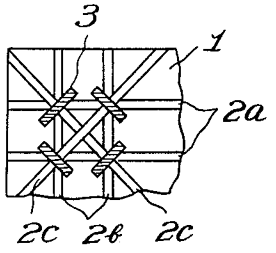

Two such substrata, with their patterns of magnetic films 3 deposited so as to become mutual, mirror images, are fabricated. Then, when the two substrata are disposed in mutually facing contact, closed magnetic circuits are formed at the intersections of the grooves 2*a* and 2*b* by the opposing film magnetic bodies 3, whereby a matrix arrangement is obtained as illustrated in FIGS. 3A and 3B. Accordingly, by merely inserting row conductors $X_1$, $X_2$, . . . into the grooves 2*a*, as indicated in FIG. 3B, and column conductors $Y_1$, $Y_2$, . . . into the grooves 2*b*, a simple memory apparatus can be assembled. When sensory conductors such as conductors Z for such functions as reading-out are necessary, the number of grooves may be increased as indicated by 2*c* in FIG. 4 or FIG. 5.

Figure 6:
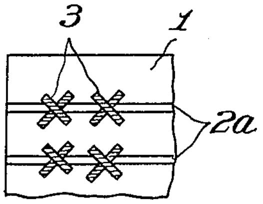

In the above-described and illustrated embodiment, the grooves 2*a*, 2*b*, 2*c*, etc., for insertion of the conductors are provided in the two substrata to be in symmetrical opposition. As one modification, however, one of the substrata may be provided with only grooves 2*a* for passing through the row conductors $X_1$, $X_2$, . . . the other substratum being provided with grooves for passing through the column conductors $Y_1$, $Y_2$, . . . and other conductors, and the two substrata are placed in facing contact, as indicated in FIG. 6. As a further modification, the film magnetic bodies may be deposited on each substratum in the form of a letter X as indicated in FIG. 6 so that, when the two substrata are assembled in facing contact, a matrix arrangement of closed magnetic circuits mutually crossing perpendicularly at each intersection of the grooves is obtained.

The above-described embodiment and modifications depend on the so-called single-magnetic-core, single-bit memory system. When a double-magnetic-core, single-bit memory system is adopted, the low reliability due to low output, which is a disadavntage of thin films, is compensated for, and, moreover, a simple matrix composition which is almost the same as that described above is obtained.

Figure 7:
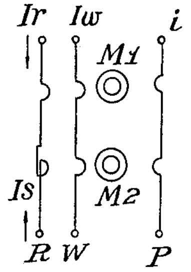
FIGURE 7 is a diagram for describing the composition of a conventional memory apparatus of the double-magnetic-core, single-bit type.
Figure 8:
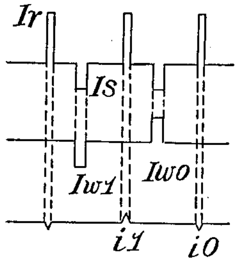
FIGURES 8 and 9 are wave form graphs for explaining the fundamental action of a memory apparatus of the double-magnetic-core, single-bit type.
Figure 9:
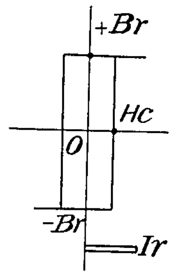

In the diagram of FIG. 7, which illustrates the composition of a conventional, double-magnetic-core, single-bit memory system, two memory magnetic cores $M_1$ and $M_2$ are provided with a reading-out and setting winding R, an information winding W, and an output winding P. Pulse current $I_r$ and $I_s$ are applied to the winding R, and a pulse current $I_w$ is applied to the winding W, whereby pulse current $i_1$ and $i_0$ as indicated in FIG. 8 are obtained from the winding P in accordance with the information currents $I_{w1}$ and $I_{w0}$. That is, if it is assumed that the magnetic cores $M_1$ and $M_2$ are in the state as shown by $-B_r$ of a rectangular hysteresis characteristic curve such as that shown in FIG. 9, the magnetic state of the core $M_1$ having the winding R wound thereon in the regular direction is shifted to $+B_r$, and that of the core $M_2$ having the winding R wound thereon in the reverse direction is maintained at $-B_r$ when a reading-out pulse current $I_r$ which is sufficiently greater than their coercive force $H_c$ is applied. Next, a setting pulse current $I_s$ is imparted simultaneously with an information pulse current $I_w$. If, at this time, the information is "1," the currents $I_s$ and $I_{w1}$ will be applied together in the superimposed state to the core $M_1$ and a magnetic field larger than the coercive force $H_c$ will be created in the core $M_1$, whereby its state will be switched from $+B_r$ to $-B_r$, whereas, in the case of $M_2$, since the said pulse currents cancel each other, the magnetic field becomes less than $H_c$, and the core $M_2$ is maintained in the state of $-B_r$. When this condition is read out by means of the next pulse current $I_r$, only the magnetic state of the core $M_1$ is shifted from $-B_r$ to $+B_r$, during which a positive (+) pulse current $i_1$ is discharged to the output winding P.

If information "0" is written in, the magnetic states of the cores $M_1$ and $M_2$ will be set, respectively, to $+B_r$ and $+B_r$. Then, when reading-out is accomplished by means of the current $I_r$, only the core $M_2$ is switched from $+B_r$ to $-B_r$, and a negative (−) pulse current $i_0$ which is the reverse of that of the previous case is created. Since, in a double-magnetic-core, single-bit memory system, information such as "1" and "0" are read out by means of (+) and (−) pulses as described above, the *S/N* ratio is high, and such devices as an input converter become unnecessary. If, in addition, the amplitudes of the currents $I_s$ and $I_w$ are, respectively, taken to be the same as the magnitudes of the coercive forces $H_c$ and 1/2 $H_c$, the selective ratio easily becomes 1:3, and it will be possible to construct a matrix of high efficiency. However, if a doughnut-shaped magnetic core made of such a substance as ferrite is used in this system in the conventional manner, the composition of the windings will become complex in comparison with that of a single-magnetic-core, single-bit memory system, and it will become necessary to use two magnetic cores per bit. Consequently, the access time will, of course, become long, and difficulties in production cost and in miniaturization will arise.

By the present invention, it is possible to eliminate the above described disadvantages of the double-magnetic-core, single-bit memory system. In the apparatus of this invention, thin-film, magnetic bodies are used in place of magnetic cores; the information writing-in winding and reading-out winding are wound as a pair; the thin-film, magnetic bodies are disposed in facing contact so as to form two main, closed, magnetic circuits by means of the windings; and the apparatus is so arranged that on one of the main, closed, magnetic circuits, the magnetic fluxes created by the information writing-in current and setting current are imparted complementarily, and in the other main, closed, magnetic circuit, the magnetic fluxes created by the aforesaid two currents cancel each other.

The details of the invention will be more clearly understood by reference to the following detailed description of representative embodiments.

Figure 10:
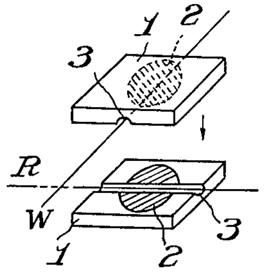
FIGURE 10 is a perspective view of another representative embodiment of the present invention.
Figure 11:
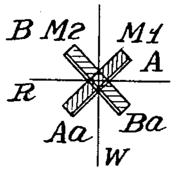
FIGURE 11 is a plan view of an equivalent diagram for explaining the functioning principle of the embodiment of FIG. 10.

In the embodiment of FIG. 10, two substrata 1, each having a groove 3 and a thin-film, magnetic body 2 made to adhere thereon with a relatively large area, such as a disk-shaped area, and in such a manner that, when the said two base plates 1 are placed in facing contact, the said magnetic bodies 2 mutually become mirror images about the said grooves 3 of the substrata 1. When the two substrata 1 are placed in facing contact so that the groove 3 of one said substratum will be perpendicular to the groove 3 of the other said substratum and conductors R and W laid in the grooves 3 will thus cross each other at a point which is encompassed by magnetic bodies, the said magnetic bodies form a closed magnetic circuit. This magnetic circuit may be considered to be exactly equivalent to an arrangement of two toroidal cores such as $M_1$ and $M_2$ at the intersection point as indicated in FIG. 11. Accordingly, the arrangement, in effect, is the same as that of FIG. 7 from which the output winding has been removed. Then, when a reading-out current $I_r$ and a setting current $I_s$ are caused to flow through the winding R, and an information current $I_w$ is caused to flow through the winding W, if, in the regions A and $A_a$, the magnetic fluxes created by the information writing-in current and the setting current are, by way of assumption, imparted complementarily, the fluxes will cancel each other in the regions B and $B_a$. Therefore, if the output is taken out of the winding W and amplified, it will be possible to effect exactly the same action as that of a double-magnetic-core, single-bit memory system, and to provide, thereby, a memory apparatus which is of extremely simple construction and has high speed, stable performance.

Figure 12A:
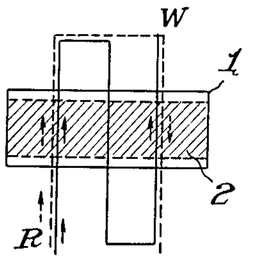
FIGURES 12A and 12B are, respectively, a plan view and a sectional view illustrating a modified embodiment of the present invention.
Figure 12B:
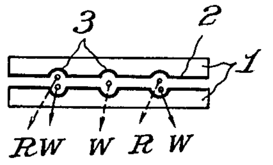

In the embodiment of FIGS. 12A and 12B, thin-film, magnetic bodies 2 in strip or ribbon form are made to adhere to substrata 1, in whose grooves 3 windings R and W are disposed, the grooves being parallel to each other and perpendicular to the longitudinal direction of the magnetic bodies 2. In plan view, the winding W is passed through successively adjacent grooves in opposite directions, while the winding R is passed through the first groove in one direction and then passed through the third groove in the opposite direction. That is, in the case of the construction illustrated in FIGS. 12A and 12B, the currents flowing through the two windings are flowing in the same direction in a certain groove (the left hand groove in the illustrations), but in the second groove from the said left hand groove, the said currents are flowing in the opposite directions. By establishing such a system as above-described, it is possible to create a component corresponding to the cores $M_1$ and $M_2$ (of the arrangement shown in FIG. 7) in a single magnetic body and to achieve the effect of a double-magnetic-core, single-bit memory system. Such a system is especially advantageous in that the bit capacity can be made large.

Figure 13:
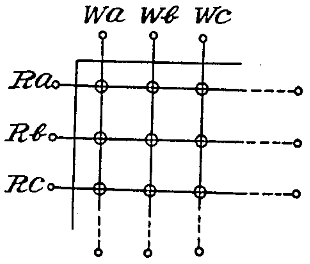
FIGURES 13 and 14 are diagrams for explaining the cases wherein the embodiments of FIGS. 10 and 12 are arranged as matrices.
Figure 14:
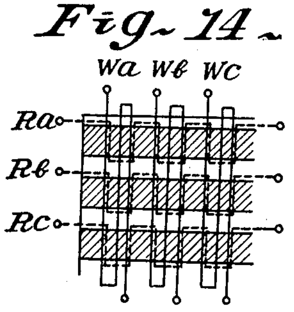

FIGS. 13 and 14 are plan views showing representative examples of matrices composed of the units of FIGS. 10 and 12, respectively.

While the foregoing description has related to the embodiments of the invention in which grooves are formed in the base bodies, and the reading-out winding and the writing-in winding are inserted thereinto, other fabrication techniques are possible. For example, a practical construction which can be produced easily is one wherein, without forming special grooves in the base bodies, thin-film, magnetic bodies are made to adhere to the base bodies and respectively used as reading-out and writing-in windings; and conductors which have been made into thin films by working into foil form, or by sputtering or electrolytic depositing and then peeling off it, are insulated by insulative layers and arranged in laminate formation.

Figure 15A:
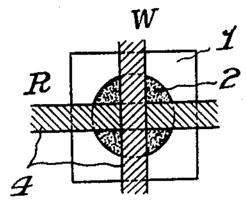
FIGURES 15A and 15B are, respectively, a plan view and a sectional view showing an improved modification of the embodiment of FIG. 10.
Figure 16A:
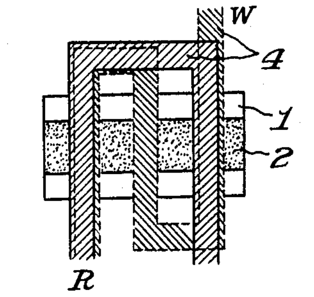
FIGURES 16A and 16B are, respectively, a plan view and a sectional view showing an improved modification of the embodiment of FIG. 12.
Figure 15B:
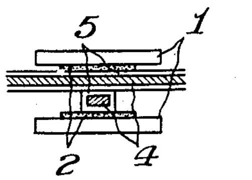
Figure 16B:
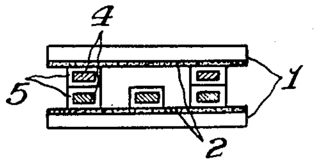
Figure 17:
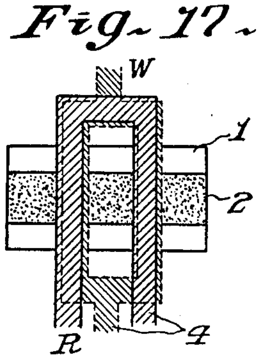
FIGURE 17 is a plan view showing a modification of the embodiment shown in FIGS. 16A and 16B.

FIGS. 15, 16 and 17 are enlarged views showing the other embodiments of the present invention in cases wherein conductors in foil form are used, FIG. 15A and FIG. 15B being, respectively, a plan view and a sectional view showing an improved modification of the embodiment of FIG. 10, and FIG. 16A and FIG. 16B being, respectively, a plan view and a sectional view showing an improved modification of the embodiment of FIG. 12. FIG. 17 is a modification of the embodiment shown in FIGS. 16A and 16B. In the above-mentioned illustrations, thin-film conductors 4 of foil form are covered by insulation coatings 5 and disposed between thin-film, magnetic bodies 2 adhering to substrate 1. In the arrangement of FIG. 17, the same effect as that of the arrangement in FIG. 16 is obtained by dividing the path of conductor W into two parallel paths instead of forming the said path in a weaving or "S" shape as in the arrangement of FIG. 16.

In such cases as described above, wherein, instead of forming grooves in the substrata for containing the conductors, conductors of foil form are used, since the foil-form conductors 4 and insulation coatings 5 are inserted between the opposed, thin-film magnetic bodies 2, the said bodies 2 do not contact but are separated by a slight distance as can be seen in FIGS. 15B and 16B. However, since the conductors 4 and the insulation coatings 5 are extremely thin, the said distance of separation can be made extremely small by forcing the substrata 1 together; and, by enlarging the opposing surface areas of the magnetic films, it is possible to obtain, in actual practice, an effect equivalent to a closed magnetic circuit formed by opposing thin-film, magnetic bodies 2 in facing contact.

In the fabrication of the substrata, the principal, usable materials are smooth insulation material such as glass, ceramics, mica, and synthetic resins. However, a conductor such as stainless steel, copper, silver, or aluminum, or a semiconductor such as germanium or silicon can also be used. The use of a semi-conductor is advantageous in such matters as magnetic flux leakage and excess-current loss, and it is especially convenient in the case of electrolytic depositing.

In the forming of the magnetic films on the substrata, the substrata may be masked by means of a stencil, and the magnetic material may be deposited by such a method as evaporative depositing, plating, or electric sputtering.

By possessing the above-described construction of matrix composition, the memory apparatus of the present invention has the advantages of high operational speed, stable operation, high reliability, high efficiency, miniature size, simple and easily-manufactured construction, and low production cost.

Since it is obvious that many changes and modifications can be made in the above-described details without departing from the nature and spirit of the invention, it is to be understood that the invention is not to be limited to the deails described herein except as set forth in the appended claims.

What we claim is:

1. A magnetic memory device comprising, in assembled condition a pair of non-magnetizable substrata juxtapositioned relative to each other, at least a pair of substantially closed magnetic circuits formed on said substrata magnetizable by relative energizing magnetic fields and each comprising, on each substrata a magnetizable element magnetizable to two stable states of magnetization, said elements comprising a pair of films deposited each on a respective substratum having configurations which are mirror images of each other, said films being relatively thin and disposed substantially in the plane of the surface of the substrata on which they are disposed, at least one conductor forming a conductive electrical path passing through at least one of said pair of magnetizable films and electrically insulated from said films for energizing said films to magnetize them alternatively to said two stable conditions, and said films being disposed on said substrata so as to be disposed opposite of each other in at least close proximity to jointly form said closed magnetic circuits, whereby an output signal of positive or negative polarity and representative of one bit of information can be derived, from said conductor in dependence upon the state of magnetization of said films.

2. A magnetic memory device according to claim 1, in which each substratum comprises a non-magnetizable metal.

3. A magnetic memory device according to claim 1, in which each substratum is a semi-conductor.

4. A magnetic memory matrix comprising, in assembled condition, a pair of non-magnetizable panels, a plurality of discrete pairs of closed magnetic circuits magnetizable by relative energizing magnetic fields, and formed on oppositely disposed major face surfaces of said panels, each pair of magnetic circuits being magnetizable between two stable states of magnetization, each pair of magnetic circuits comprising on each major face surface of said panels a magnetic film deposit jointly forming a pair of films substantially in the plane of the respective major surface on which formed and each a mirror image of the other, said panels being disposed in assembled condition with the films forming said magnetic circuits opposite to each other, conductors electrically insulated from said films forming paths across said films of a given respective combination of pairs of films for energizing the pairs of magnetic circuits discretely, selectively, alternatively to said two stable conditions, whereby an output signal of positive or negative polarity and representative of one bit of information can be derived from one of said conductors, in dependence upon the state of magnetization of the selected pair of films.

5. A magnetic memory matrix comprising, in assembled condition, a pair of non-magnetizable panels, a plurality of discrete pairs of closed magnetic circuits energizable by energizing signals and formed on oppositely disposed major face surfaces of said panels, each pair of magnetic circuits being magnetizable between two stable states of magnetization, each pair of magnetic circuits comprising on each major face surface of said panels a magnetic film deposit jointly forming a pair of films substantially in the plane of the respective major surface on which formed and each a mirror image of the other, said panels being disposed in assembled condition with the films forming said magnetic circuits opposite to each other, conductors electrically insulated from said films forming paths across said films of a given respective combination of pair of films for energizing the pairs of magnetic circuits to magnetize them discretely, selectively, alternatively to said two stable conditions, other conductors for sensing the state of magnetization of respective combinations of pairs of films of said magnetic circuits individually and selectively thereby to obtain an output signal of positive or negative polarity thereform and representative of one bit of information.

6. A magnetic memory matrix comprising, in assembled condition, a pair of non-magnetizable panels, a plurality of discrete pairs of substantially closed magnetic circuits magnetizable by relative energizing magnetic fields and formed on oppositely disposed major face surfaces of said panels, each pair of magnetic circuits being magnetizable between two stable states of magnetization, each magnetic circuit comprising on each major face surface of said panels a magnetic film deposit jointly forming a pair of films substantially in the plane of the respective major surface on which it is formed and each a mirror image of the other, said panels being disposed in assembled condition with the films forming said magnetic circuits at least closely adjacent opposite to each other, ribbon conductors disposed flat on a major surface of a given panel electrically insulated from said films forming conductive paths across at least one of said films of a given respective combination of pairs of films for energizing the magnetic circuits to magnetize them individually, selectively alternately to said two stable conditions, whereby an output signal of positive or negative polarity and representative of one bit of information can be derived, from one of said ribbon conductors in dependence upon the state of magnetization of the selected pair of films.

7. A magentic memory matrix comprising, in assembled condition, a pair of non-magnetizable panels, a plurality of discrete pairs of substantially closed magnetic circuits magnetizable by relative energizing magnetic fields and formed on oppositely disposed major face surfaces of said panels, each pair of magnetic circuits being magnetizable between two stable states of magnetization, each magnetic circuit comprising on each of said major face surfaces of said panels, a magnetic film deposit jointly forming a pair of films substantially in the plane of the respective major surface on which it is formed and each a mirror image of the other, said panels being disposed in assembled condition with the films forming said magnetic circuits at least closely adjacent opposite to each other, ribbon conductors disposed flat on a major surface of a given panel electrically insulated from said films forming conductive paths across said films of a given respective combination of pairs of films for energizing the pairs of magnetic circuits individually, selectively, alternatively to said two stable conditions, other ribbon conductors for sensing the state of magnetization individually, selectively, and a relatively thin coat of insulative material on said ribbon conductors, whereby an output signal of positive or negative polarity and representative of one bit of information can be derived from the last mentioned conductors in dependence upon the state of magnetization of the films.

8. A magnetic memory matrix comprising, in assembled condition a pair of non-magnetizable panels, a plurality of discrete pairs of closed magnetic circuits energizable by relative energizing magnetic fields and formed on oppisitely disposed major face surfaces of said panels, each magnetic circuit being magnetizable between two stable states of magnetization, each magnetic circuit comprising on each major face surface of said panels a magnetic film deposit jointly forming a pair of films substantially in the plane of the respective major surface on which formed and each a mirror image of the other, said panels being disposed in assembled condition with the pairs of films forming said magnetic circuits opposite to each other, conductors electrically insulated from said films forming paths across at least one of said films of a given respective combination of pairs of films for energizing the magnetic circuits discretely, selectively, alternatively to said two stable conditions, said conductors being arranged in rows and columns and said pairs of magnetic circuits being arranged at the intersection of said rows and columns of conductors, whereby an output signal of positive or negative polarity can be derived, from one of said rows or columns of conductors in dependence upon the state of magnetization of the selected pair of films.

9. A magnetic memory matrix comprising, in assembled condition a pair of non-magnetizable panels, a plurality of discrete pairs of closed magnetic circuits magnetizable by relative energizing magnetic fields and formed on oppositely disposed major face surfaces of said panels, each magnetic circuit being magnetizable between two stable states of magnetization, each magnetic circuit comprising on each major surface of said panels a magnetic film deposit jointly forming a pair of films substantially in the plane of the respective major surface on which formed and each a mirror image of the other, said panels being disposed in assembled condition with the pairs of films forming said magnetic circuits opposite to each other, conductors electrically insulated from said films forming said magnetic circuits opposite to each other, conductors electrically insulated from said films forming paths across at least one of said films of a given respective combination pairs of films for energizing the magnetic circuits discretely, selectively, alternatively to said two stable conditions, said conductors being arranged in rows and columns and said pairs of mangetic circuits being arranged at the intersection of said rows and columns of conductors so that in operation magnetic fields with respect to row and column conductors are developed substantially inorthogonal states to each other, whereby an output signal of positive or negative polarity representative of one bit of information can be derived, from selected ones of said rows or column conductors, in dependence upon the state of magnetization of a selected pair of films.

10. A magnetic memory matrix comprising, in assembled condition a pair of non-magnetizable panels, a plurality of discrete pairs of closed magnetic circuits magnetizable by relative energizing magnetic fields and formed on oppositely disposed major face surfaces of said panels, each magnetic circuit being magnetizable between two stable states of magnetization, each magnetic circuit comprising on each major face surface of said panels a magnetic film deposit jointly forming a pair of foil films substantially in the plane of the respective major surface on which formed and each a mirror image of the other, said panels being disposed in assembled condition with the pairs of films forming said mangetic circuits opposite to each other, conductors electrically insulated from said films forming paths across at least one of said films of a given respective combination of pairs of films for energizing the magnetic circuits discretely, selectively, alternatively, to said two stable conditions, said conductors being arranged in rows and columns and intersecting two portions with respect to each memory element for storing a bit of binary information, and said pairs of magnetic circuits being arranged in parallel to each other, at the intersection of said row and columns of conductors, whereby an output signal of positive or negative polarity and representative of one bit of information can be derived, from one of said row or column conductors, in dependence upon the state of magnetization of the selected pair of films.

11. A magnetic memory matrix comprising, in assembled condition, a pair of non-magnetizable panels, a plurality of discrete pairs of closed mangetic circuits magnetizable by relative energizing magnetic fields and formed on oppositely disposed major face surfaces of said panels, each pair of magnetic circuits being magnetizable between two stable states of mangetization, each pair of magnetic circuits comprising on each major surface of said panels a magnetic film deposit jointly forming a pair of films substantially in the plane of the respective major surface on which formed and each a mirror image of the other, said panels being disposed in assembled condition with the films forming said mangetic circuits opposite to each other, conductors electrically insulated from said films forming paths across said films of a given respective combination of pairs of films for energizing the pairs of magnetic circuits discretely, selectively, alternatively to said two stable conditions, and at least one of said panels having recesses to receive said conductors to permit said films forming discrete closed circuits to make intimate mutual contact, whereby an output signal of positive or negative polarity and representative of one bit of information can be derived from selected ones of said conductors in dependence upon the state of magnetization of the selected pair of films.

12. A magnetic memory matrix comprising, in assembled condition, a pair of non-magnetizable panels, a plurality of discrete pairs of closed magnetic circuits energizable by realtive energizing magnetic fields and formed on oppositely disposed major face surfaces of said panels, each pair of magnetic circuits being magnetizable between two stable states of magnetitzation, each pair of magnetic circuits comprising on each major surface of said panels a magnetic film deposit jointly forming a pair of films substantially in the plane of the respective major surface on which formed and each a mirror image of the other, said panels being disposed in assembled condition with the films forming said magnetic circuits opposite to each other, conductors electrically insulated from said films forming paths across said films of a given respective combination of pairs of films for energizing the pairs of magnetic circuits discretely, selectively, alternatively to said two stable conditions, other conductors for sensing the state of magnetization of respective combinations of pairs of films of said magnetic circuits individually and selectively, and at least one of said panels having recesses to receive said conductors to permit said films forming discrete closed circuits to make intimate mutual contact, whereby an output signal of positive or negative polarity and representative of one bit of information can be derived from selected ones of said other conductors in dependence upon the state of magnetization of the selected pair of films.

References Cited by the Examiner

UNITED STATES PATENTS

| | | | |
|---|---|---|---|
| 2,978,683 | 4/61 | Alexander | 340—174 |
| 2,997,695 | 8/61 | Conger et al. | 340—174 |
| 3,077,021 | 2/63 | Brownlow | 340—174 X |

FOREIGN PATENTS

| | | |
|---|---|---|
| 225,970 | 2/59 | Australia. |

OTHER REFERENCES

Pages 120–123, Dec. 10–12, 1956—Publication I: Proceedings of Eastern Joint Conf., "A Compact Coincident-Current Memory" by A. V. Pohm and S. M. Rubens, published June 1957.

IRVING L. SRAGOW, *Primary Examiner.*